United States Patent
Porter et al.

(10) Patent No.: US 11,193,864 B2
(45) Date of Patent: Dec. 7, 2021

(54) DEVICES, SYSTEMS, AND METHODS FOR PREPARING FIELD SAMPLES

(71) Applicant: PerkinElmer Health Sciences, Inc., Waltham, MA (US)

(72) Inventors: Nathan L. Porter, Kaysville, UT (US); Anthony David Rands, Vineyard, UT (US)

(73) Assignee: PERKINELMER HEALTH SCIENCES, INC., Waltham, MA (US)

( * ) Notice: Subject to any disclaimer, the term of this patent is extended or adjusted under 35 U.S.C. 154(b) by 0 days.

(21) Appl. No.: 17/008,920

(22) Filed: Sep. 1, 2020

(65) Prior Publication Data
US 2020/0400540 A1   Dec. 24, 2020

Related U.S. Application Data

(62) Division of application No. 15/976,426, filed on May 10, 2018, now Pat. No. 10,794,806.

(51) Int. Cl.
*G01N 1/44* (2006.01)
*G01N 1/10* (2006.01)

(52) U.S. Cl.
CPC ............... *G01N 1/44* (2013.01); *G01N 1/10* (2013.01)

(58) Field of Classification Search
CPC .......................... G01N 1/44; G01N 35/1079
See application file for complete search history.

(56) References Cited

U.S. PATENT DOCUMENTS

| | | | |
|---|---|---|---|
| 4,237,733 A | 12/1980 | Boege et al. | |
| 6,360,794 B1 * | 3/2002 | Turner | B65B 3/003 141/1 |
| 9,000,360 B2 * | 4/2015 | DeWitte | G01N 30/16 250/288 |
| 9,322,750 B2 | 4/2016 | Oliphant et al. | |
| 9,687,841 B2 * | 6/2017 | Hofmann | B01L 3/0289 |
| 9,869,688 B2 * | 1/2018 | Bremer | G01N 35/1079 |
| 10,302,649 B2 * | 5/2019 | Clinton | G01N 21/66 |
| 10,379,010 B2 * | 8/2019 | Whelan | B01L 3/502 |
| 2007/0137320 A1 * | 6/2007 | Bremer | G01N 35/1079 73/864.01 |
| 2011/0239792 A1 | 10/2011 | Sato et al. | |

(Continued)

OTHER PUBLICATIONS

HAPSITE® Headspace Sampling System, INFINICON, 2 pages, available as of filing date.

(Continued)

*Primary Examiner* — Paul M. West
*Assistant Examiner* — Mark A Shabman
(74) *Attorney, Agent, or Firm* — Myers Bigel, P.A.

(57) ABSTRACT

A system for preparing a test sample includes a vial holder, a needle trap connected to the vial holder, and a sample preparation station. The vial holder includes a vial chamber configured to hold a vial, a purge gas needle, and a needle trap heater. The needle trap includes a needle with the needle trap heater surrounding a distal end portion of the needle. A packing bed is disposed in the needle at the distal end portion. The sample preparation station includes a housing and a vial heater assembly including a vial heater and defining a cavity. The vial holder is configured to be received in the cavity in an installed position with the vial heater surrounding at least a portion of the vial.

17 Claims, 12 Drawing Sheets

(56) References Cited

U.S. PATENT DOCUMENTS

2013/0233054 A1* 9/2013 Oliphant .............. G01N 1/2214
                                                              73/23.37
2016/0332156 A1* 11/2016 Tajima ............... G01N 35/1079
2017/0184554 A1* 6/2017 Ghiasvand ............ B01J 20/205

OTHER PUBLICATIONS

HAPSITE® SituProbe Sampling Sysem, INFINICON, 2 pages, available as of filing date.
International Search Report and Written Opinion for PCT/US2019/031067 dated Jun. 19, 2019, 11 pages.
Product Note, Gas Chromatography/Mass Spectrometry, PerkinElmer, 8 pages, available as of filing date.
Product Note, Gas Chromatography/Mass Spectrometry, Sample Prep Station (SPS-3), PerkinElmer, 2 pages, available as of filing date.

* cited by examiner

DEVICES, SYSTEMS, AND METHODS FOR PREPARING FIELD SAMPLES

RELATED APPLICATIONS

The present application is a divisional application of and claims priority from U.S. patent application Ser. No. 15/976,426, filed May 10, 2018, the disclosure of which is incorporated herein by reference in its entirety.

BACKGROUND

Use of purge and trap (P&T) and heated head space (HHS) equipment is common in the laboratory. Such devices are less common for field sampling.

SUMMARY

According to some embodiments of the technology, a system for preparing a test sample includes a vial holder, a needle trap connected to the vial holder, and a sample preparation station. The vial holder includes a body, a vial chamber extending downwardly from the body and configured to hold a vial, a purge gas needle extending downwardly from the body, and a needle trap heater in the body. The needle trap includes a needle with the needle trap heater surrounding a distal end portion of the needle. The needle trap includes at least one packing bed disposed in the needle at the distal end portion. The sample preparation station includes a housing and a vial heater assembly in and/or on the housing. The vial heater assembly includes a vial heater and defines a cavity. The vial holder is configured to be received in the cavity in an installed position with the vial heater surrounding at least a portion of the vial.

In some embodiments, the vial holder includes a needle trap protection needle extending downwardly from the body. The distal end portion of the needle trap needle may be received in the needle trap protection needle. The needle trap heater may surround at least a portion of the needle trap protection needle.

In some embodiments, the vial chamber defines a longitudinal axis, the purge needle defines a purge needle axis that is substantially coaxial with the longitudinal axis, and/or the needle trap protection needle defines a needle trap protection needle axis that is offset from and substantially parallel to the longitudinal axis.

In some embodiments, the needle trap heater is configured to heat at an offset temperature that is higher than a temperature that the vial heater heats the vial. The offset temperature may be at least 1° C. to avoid water condensation on the at least one packing bed. The sample preparation station may include a controller. The controller may be configured to independently operate the needle trap heater and the vial heater to heat at different temperatures.

In some embodiments, the vial heater assembly includes a needle trap heater connection. The vial holder may include a vial heater connection. The needle trap heater connection and the vial heater connection may engage one another when the vial holder is received in the cavity in the installed position. The sample preparation station may include a power source. The power source may be configured to power both the needle trap heater and the vial heater.

In some embodiments, the system includes the vial and a sample held in the vial. The sample preparation station may include a pressurized gas supply containing an inert gas. The gas supply may be in fluid communication with the gas purge needle when the vial holder is received in the cavity in the installed position. The gas supply and the purge needle are configured to purge the sample in the vial with the inert gas such that analytes are trapped on the at least one packing bed of the needle trap.

In some embodiments, the system is portable and configured to be used in the field.

Some other embodiments of the technology are directed to a method of preparing a test sample. The method includes providing a vial comprising a septum at an upper portion thereof, a vial holder, a needle trap, and a sample preparation station. The vial holder includes a body, a vial chamber extending downwardly from the body, a purge gas needle extending downwardly from the body, and a needle trap heater in the body. The needle trap includes a needle having a distal end portion and at least one packing bed disposed in the needle at the distal end portion. The sample preparation station includes a housing and a vial heater assembly. The vial heater assembly includes a vial heater and defines a cavity. The method includes: connecting the needle trap and the vial holder such that the needle trap heater surrounds at least a portion of the at least one packing bed; then inserting the vial into the vial chamber of the vial holder such that the purge gas needle pierces the septum of the vial; and then inserting the vial holder into the cavity of the vial heater assembly such that the vial heater surrounds at least a portion of the vial.

In some embodiments, the vial holder includes a needle trap protection needle extending downwardly from the body. Connecting the needle trap and the vial holder may include receiving the needle of the needle trap in the needle trap protection needle of the vial holder. Inserting the vial into the vial chamber of the vial holder may include piercing the septum of the vial with the needle trap protection needle.

In some embodiments, the method includes heating a sample in the vial using the vial heater having a first temperature setting, heating the at least one packing bed using the needle trap heater having a second temperature setting, and purging the sample by injecting an inert gas through the purge gas needle. The second temperature setting may be higher than the first temperature setting.

In some embodiments, the vial heater assembly includes a needle trap heater connection. The vial holder may include a vial heater connection on the body. Inserting the vial holder into the cavity of the vial heater assembly may include connecting the needle trap heater connection and the vial heater connection such that the sample preparation station provides power to the needle trap heater.

In some embodiments, the vial chamber comprises a terminal end defining an end opening. Inserting the vial into the vial chamber of the vial holder may include receiving the upper portion of the vial through the end opening and urging the vial toward the body of the vial holder.

In some embodiments, the vial holder includes a plate and a spring disposed in the vial chamber. The purge gas needle may extend through a center of the plate. The plate may translate toward the body of the vial holder and the spring may compress as the vial is urged toward the body of the vial holder.

Some other embodiments of the technology are directed to a vial holder for use in a system for preparing a sample. The vial holder includes a body, a vial chamber held by and extending downwardly from the body, a purge gas needle held by and extending downwardly from the body in the vial chamber, and a needle trap heater in the body and surrounding at least a portion of the needle trap protection needle. The vial holder is configured to connect with a needle trap such that a needle of the needle trap containing at least one bed of packing material is at least partially surrounded by the needle trap heater. The vial holder with the needle trap connected thereto is configured to receive the vial in the vial chamber such that the purge needle punctures a septum that is positioned at an upper portion of the vial. The vial holder with the needle trap connected thereto and the vial received therein is configured to be slidably received in a vial heater assembly of a sample preparation station in an installed position with the vial at least partially surrounded by a vial heater of the vial heater assembly.

In some embodiments, the vial holder includes a plate in the vial chamber and a spring between the plate and the body. The vial chamber may include a terminal end defining an end opening. The vial holder may be configured to receive the vial through the end opening and into the vial chamber such that the plate is urged upwardly and the spring is compressed. The vial chamber may define a central axis. The purge needle may extend along the central axis. The purge needle may extend through the plate. The plate and the spring may cooperate to maintain the purge needle along the central axis as the vial holder receives the vial.

In some embodiments, the vial holder includes a vial heater connection on the body. The vial heater connection may be configured to engage a needle trap heater connection on the vial heater assembly when the vial holder is slidably received in the vial heater assembly of the sample preparation station in the installed position.

In some embodiments, the vial holder includes a needle trap cover extending downwardly from the body in the vial chamber. The needle trap cover may be configured to receive the needle of the needle trap when the vial holder is connected to the needle trap.

Further features, advantages and details of the present technology will be appreciated by those of ordinary skill in the art from a reading of the figures and the detailed description of the preferred embodiments that follow, such description being merely illustrative of the present technology.

DETAILED DESCRIPTION

The present technology now will be described more fully hereinafter with reference to the accompanying drawings, in which illustrative embodiments of the technology are shown. In the drawings, the relative sizes of regions or features may be exaggerated for clarity. This technology may, however, be embodied in many different forms and should not be construed as limited to the embodiments set forth herein; rather, these embodiments are provided so that this disclosure will be thorough and complete, and will fully convey the scope of the technology to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner.

These and other objects and/or aspects of the present technology are explained in detail in the specification set forth below.

Unless otherwise defined, all terms (including technical and scientific terms) used herein have the same meaning as commonly understood by one of ordinary skill in the art to which this technology belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
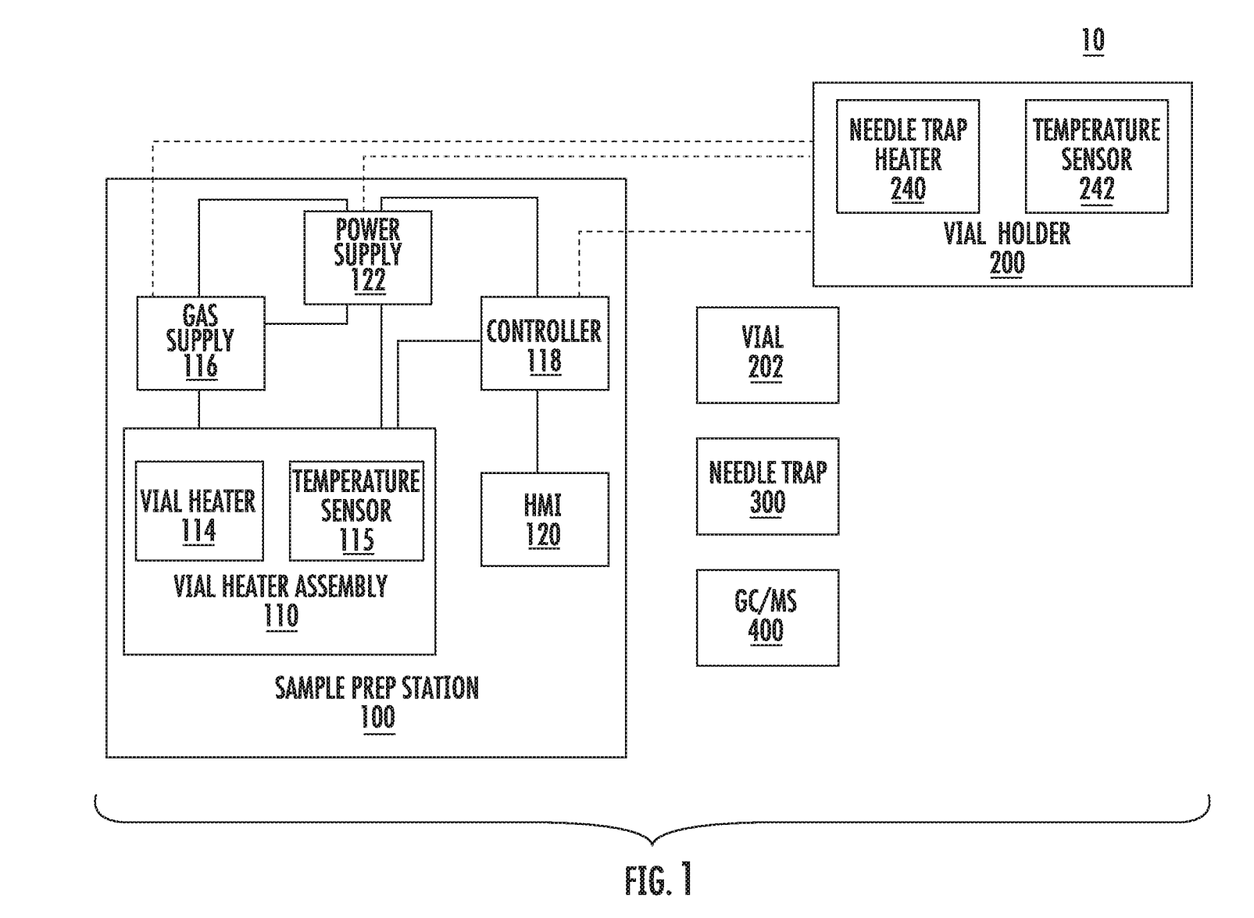
FIG. 1 is a schematic diagram of a system for preparing test samples according to some embodiments.

Referring to FIG. 1, a system 10 for preparing samples includes a sample preparation station 100, a vial holder 200, a vial 202, and a needle trap 300.

Figure 2:
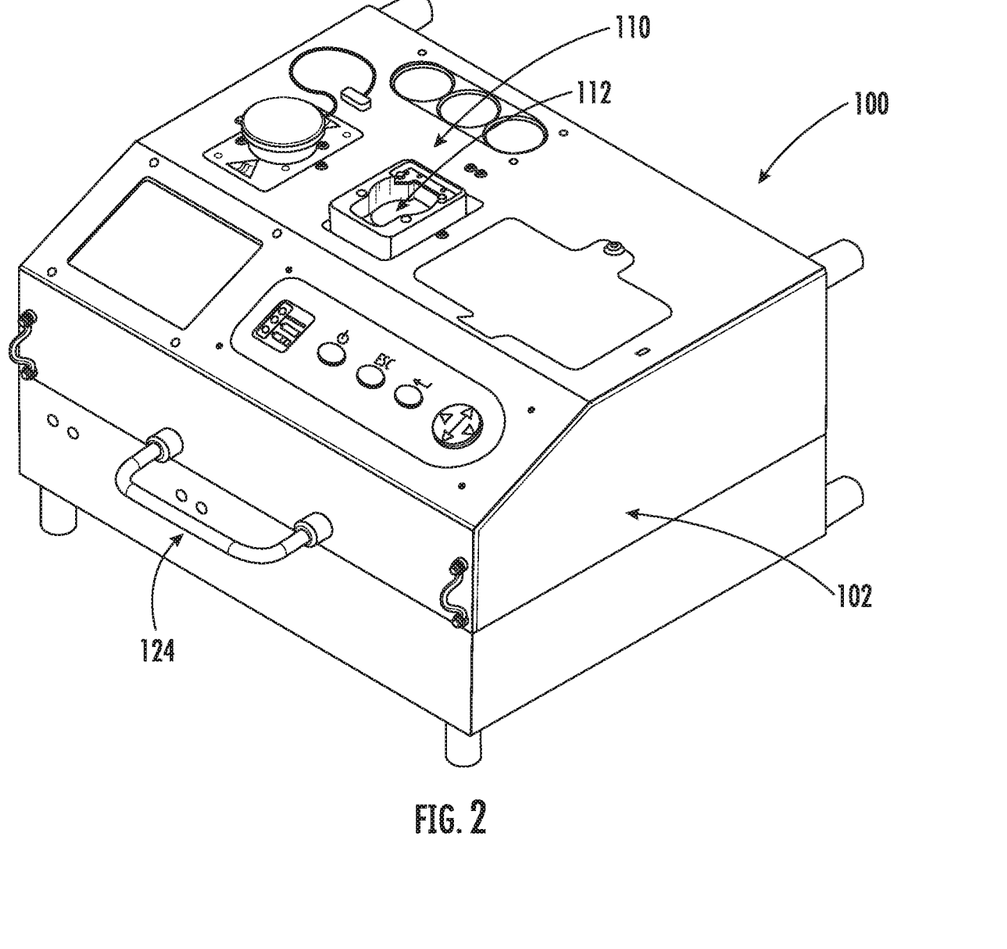
FIG. 2 is a perspective view of a sample preparation station of the system of FIG. 1.

Referring to FIGS. 1 and 2, the sample preparation station 100 includes a housing 102. The station 100 includes a vial heater assembly 110. The vial heater assembly 110 defines a vial holder receiving cavity 112. As described in more detail below, the receiving cavity 112 is configured to receive the vial holder 200 that is holding the vial 202. The vial heater assembly 110 also includes a vial heater 114 and a temperature sensor 115 such as a resistance temperature detector (RTD) sensor.

The station 100 may further include a pressurized gas supply 116, a controller 118, and a human-machine interface (HMI) 120. The station 100 includes a power supply 122 (e.g., one or more batteries). The power supply 122 is configured to supply power to the vial heater assembly 110, the gas supply 116, the controller 118, and/or the HMI 120.

The station 100 is portable and configured to prepare samples in the field. The station 100 may include a handle 124 coupled to the housing 102.

Figure 3:
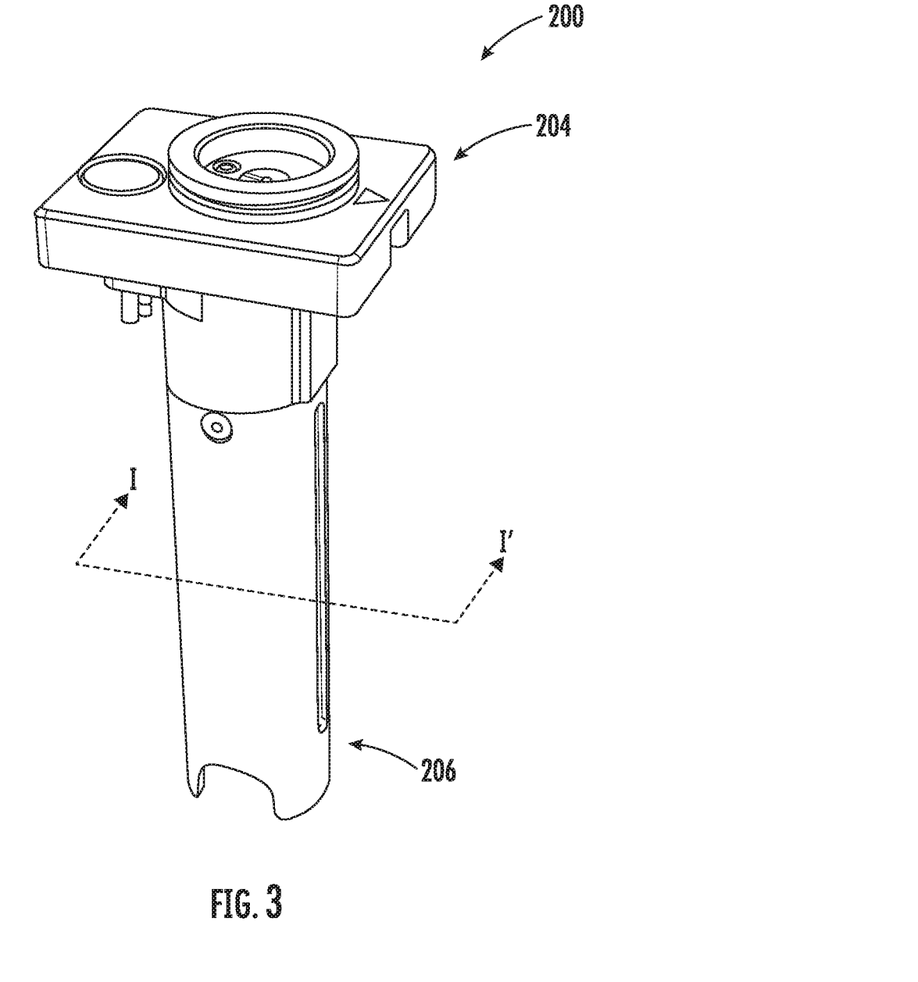
FIG. 3 is a perspective view of a vial holder of the system of FIG. 1.
Figure 4:
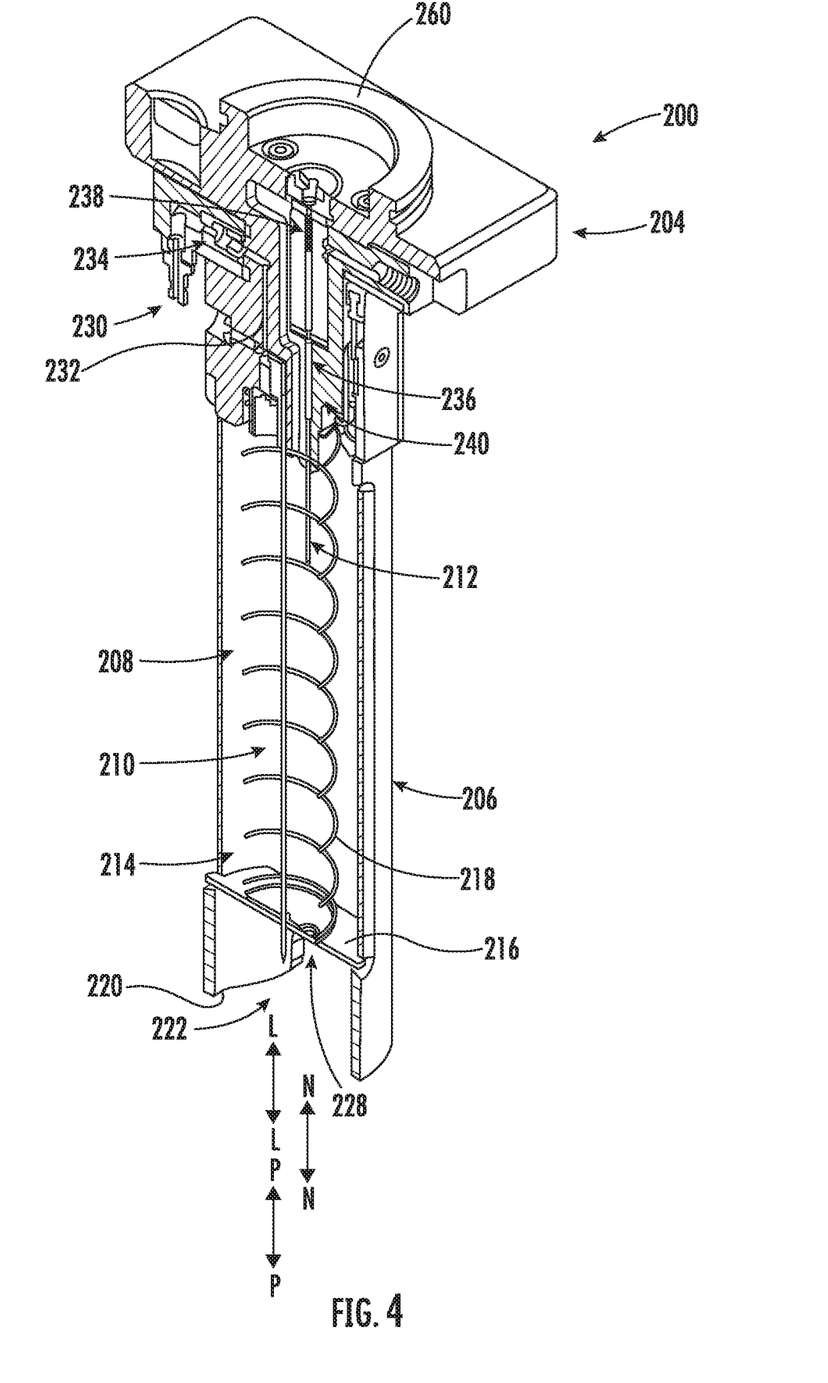
FIG. 4 is a perspective sectional view of the vial holder taken along the line I-I' of FIG. 3.
Figure 5:
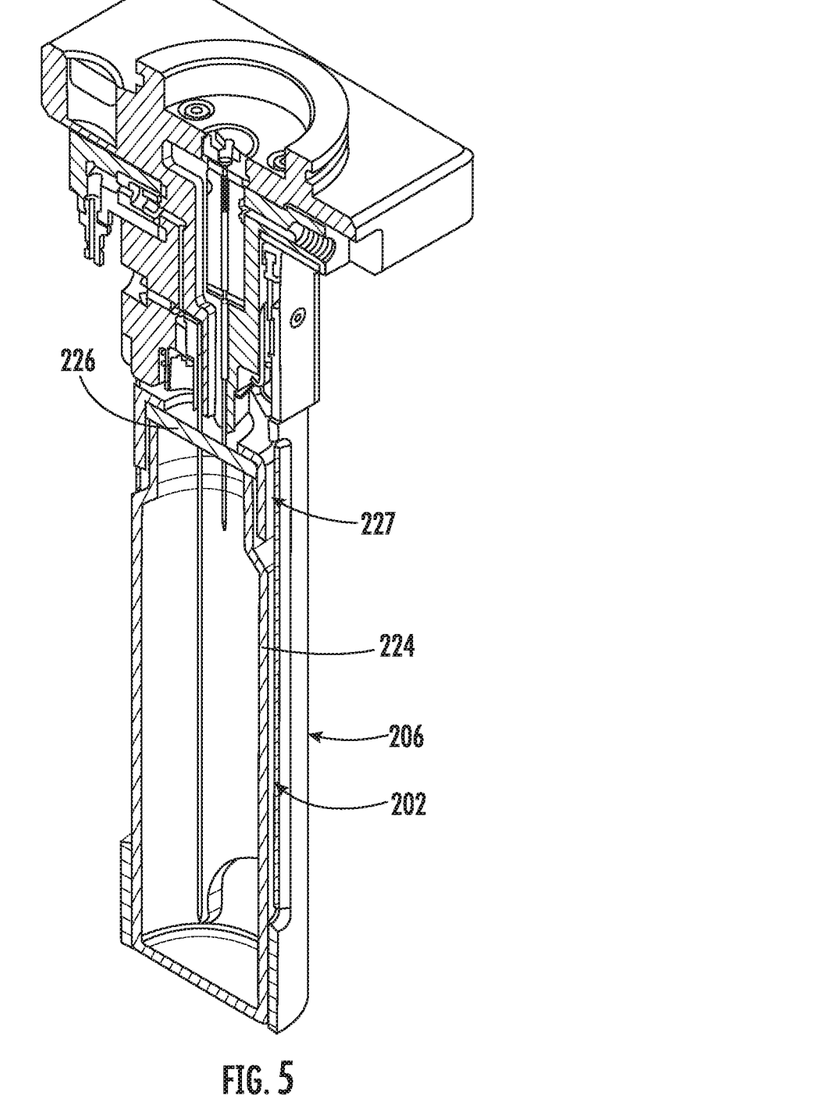
FIG. 5 is a perspective sectional view of the vial holder of FIG. 4 with a vial inserted into the vial holder.

The vial holder 200 is illustrated in FIGS. 3-5. The vial holder 200 includes a body 204 and a vial chamber 206 extending downwardly from the body 204. The chamber 206 defines a cavity 208. A purge gas needle 210 and an optional needle trap protection needle or needle trap cover 212 also extend downwardly from the body 204 and into the cavity 208.

A needle guide assembly 214 is in the chamber 206. The needle guide assembly 214 may include a plate 216 and a spring 218. The spring-loaded plate 216 may hold the purge gas needle 210 in position when the vial is inserted in the chamber 206 as described below.

The chamber 206 defines a longitudinal or central axis L-L. The purge gas needle 210 defines a purge gas needle axis P-P. The needle trap protection needle 212 may define a needle trap protection needle axis N-N. The purge gas needle axis P-P may be coaxial with the chamber longitudinal axis L-L. The needle trap protection needle axis N-N may be offset from and parallel to the chamber longitudinal axis L-L. Therefore, the purge gas needle 210 may be centered in the chamber 206 and the needle trap protection needle 212 may be off center in the chamber 206.

The purge gas needle 210 may be a pencil point needle with a plurality of holes (e.g., 12 holes) in the side just above the point. The needle trap protection needle 212 may be a pencil point needle with a single side hole.

A terminal end 220 of the chamber 206 defines a chamber opening 222 that communicates with the chamber cavity 208. The vial 202 is inserted into the chamber 206 by receiving the vial through the chamber opening 222 and into the chamber cavity 206. The plate 216 is urged upwardly and the spring 218 is compressed as the vial is inserted into the chamber 206.

The vial 202 includes a body 224 and a septum 226 at an upper portion 227 of the body 224. The purge gas needle 210 and the needle trap protection needle 212 may pierce the septum 224 as the vial is inserted into the chamber to a fully inserted position shown in FIG. 5.

An aperture 228 is defined in the plate 216. The needle trap protection needle 212 may be received through the plate 216 as the plate 216 is urged upwardly in response to insertion of the vial 202 into the chamber 206.

A purge gas inlet 230 is connected to or defined in the body 204. A purge gas flow channel 232 is defined in the body 204 and extends between the purge gas inlet 230 and the purge gas needle 210. The purge gas inlet 230 is in fluid communication with the gas supply 116 (FIG. 1). A check valve 234 may be provided to prevent back flow of the purge gas.

Seals 236, 238 are provided in the body 204 to force a sample through the needle trap, as described in more detail below.

A needle trap heater 240 is in the body 204. The needle trap heater 240 may surround at least a portion of the needle trap protection needle 212. The needle trap heater 240 may be generally cylindrical. The needle trap heater 240 may extend to a bottom of the body 204. The vial holder 200 also includes a temperature sensor 242 such as a RTD sensor (FIG. 1).

Figure 6:
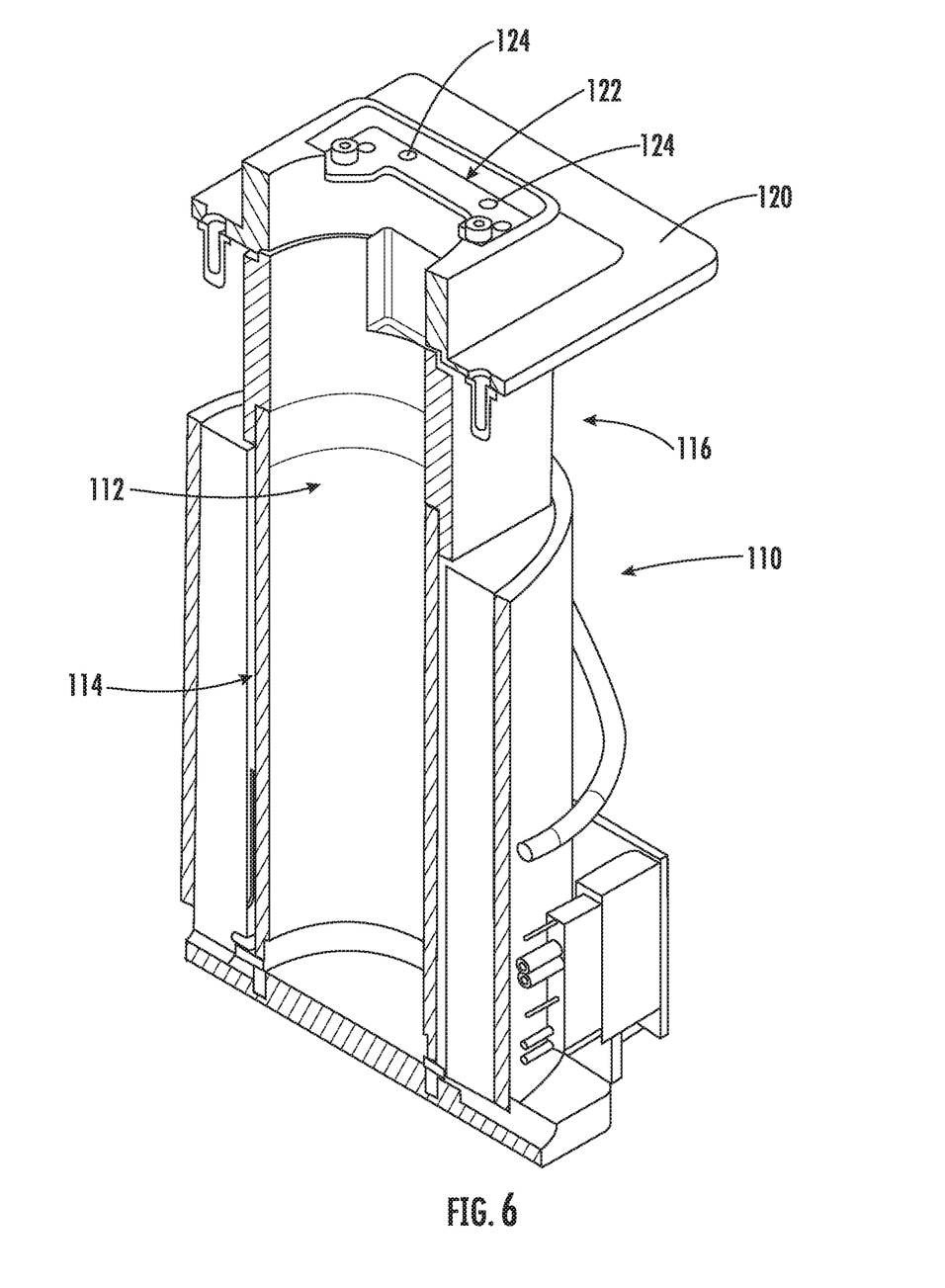
FIG. 6 is a perspective sectional view of a vial heater assembly associated with the sample preparation station of FIG. 2.

Referring now to FIGS. 1 and 6, the vial heater assembly 110 defines the cavity 112. The assembly 110 includes a body 116. The vial heater 114 is held in the body 116. The vial heater 114 is configured to surround or substantially surround the vial 202 when the vial holder 200 holding the vial is inserted into the cavity 112.

A seat 120 is on the body 116. The seat 120 may be or include a gasket. The vial heater assembly 110 may be coupled to the housing 102 (FIG. 2) at the seat 120 (e.g., using fasteners). A connection 122 for the needle trap heater 240 is on the seat 120. The needle trap heater connection 122 may include one or more contacts, pads, or receptacles 124.

Figure 7:
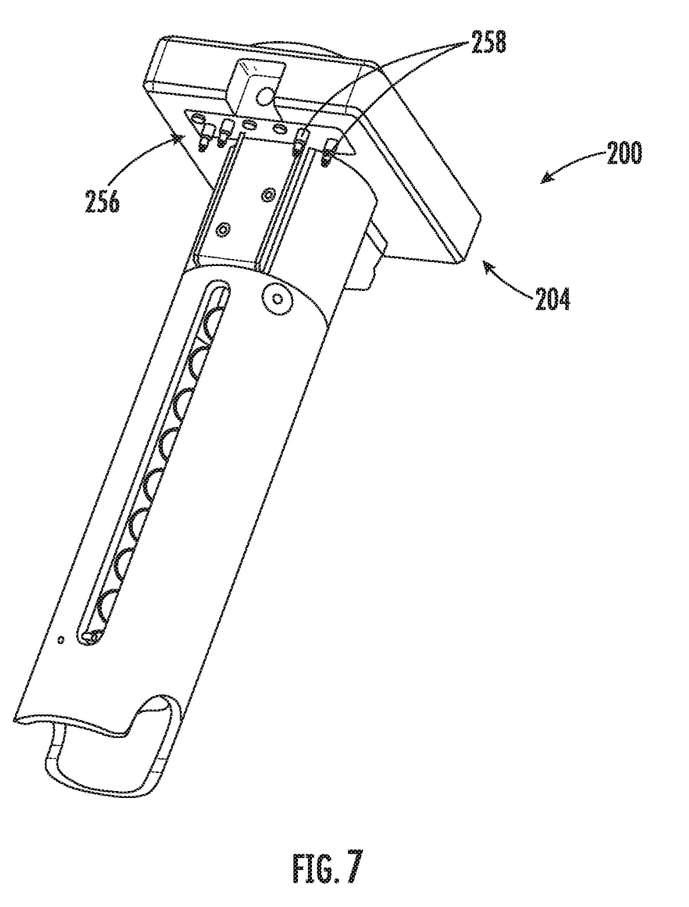
FIG. 7 is another perspective view of the vial holder of FIG. 3.

Referring to FIG. 7, the vial holder 200 includes a connection 256 for the vial heater assembly 110 on the body 204 of the vial holder 200. The vial heater connection 256 may include one or more pins 258 (e.g., pogo pins).

The connections 122, 256 are configured to engage one another when the vial holder 200 is inserted into the vial heater assembly cavity 112 of the sample preparation station 100. For example, the pins 258 of the connection 256 may be received in or on the pads or the receptacles 254 of the connection 252. With this configuration, the needle trap heater 240 and the vial heater 248 may both be powered by the power supply 122 (FIG. 1). Further, the vial holder 240 is electrically connected to the controller 118 and is in fluid communication with the purge gas supply 116 (FIG. 1).

Other configurations are contemplated. For example, the needle trap heater connection 122 may include one or more pins and the vial heater connection 256 may include one or more pads or receptacles.

Figure 8:
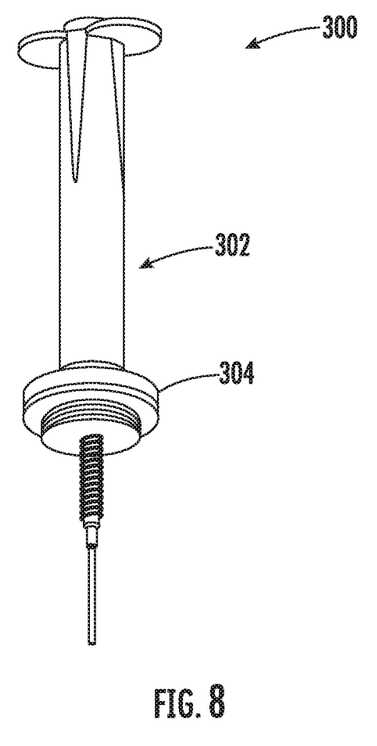
FIG. 8 is a perspective view of a needle trap of the system of FIG. 1.
Figure 9:
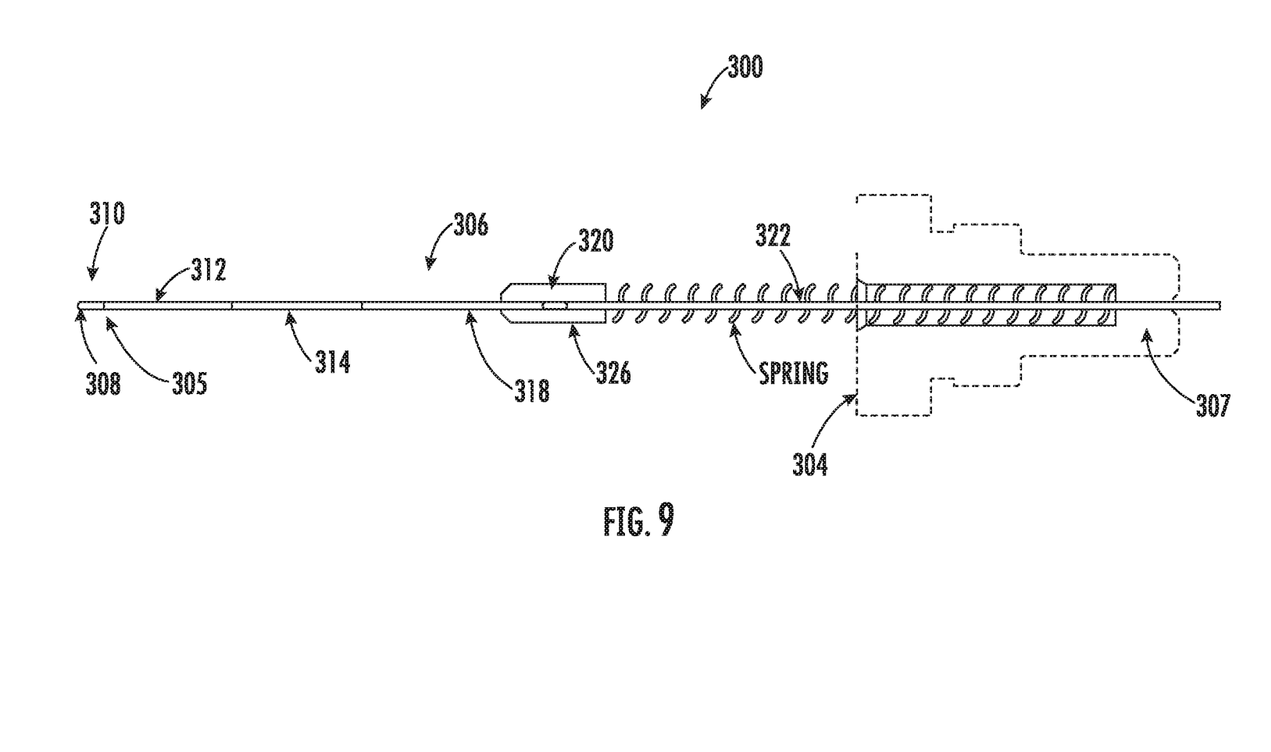
FIG. 9 is a cutaway side view of the needle trap of FIG. 8.

The needle trap 300 is described with reference to FIGS. 8 and 9. The needle trap 300 includes a needle packed with a sorbent bed and is used for extraction of a sample followed by thermal desorption into a GC system.

The needle trap 300 may include a body 302 having a stop 304. A needle 306 extends from the body 302. The needle 306 includes a proximal end portion 305 held by the body 302 and an opposite distal end portion 307. The needle 306 includes a rounded tip 308 at a distal working end. A first loose fitting piece of wire 310 is in the rounded tip 308. The first loose fitting piece of wire 310 may be cut at an angle.

The function of the first loose fitting piece of wire 310 may be to keep first and second packing beds 312, 314 from falling out of the needle 306.

The first packing bed 312 is disposed in the needle 306 and is adjacent the first loose fitting piece of wire 310. The second packing bed 314 is disposed in the needle 306 and is adjacent the first packing bed 312. A second loose fitting wire 318 is disposed in the needle 306 and is adjacent the second packing bed 314. The second loose fitting wire 318 extends past a side hole 320. A tight fitting wire 322 is disposed adjacent the second loose fitting wire 318 and extends out of the needle 306 opposite the working end. The function of the tight fitting wire 322 may be to act as a plug that prevents the flow of fluid past the side hole 320 and out of the non-working end of the needle 306. The side hole 320 may be sealed by a sleeve 326 such as a Teflon sleeve.

The needle trap 300 may be the same or similar to the needle trap described in U.S. Pat. No. 9,322,750, the disclosure of which is incorporated by reference herein in its entirety.

Figure 10:
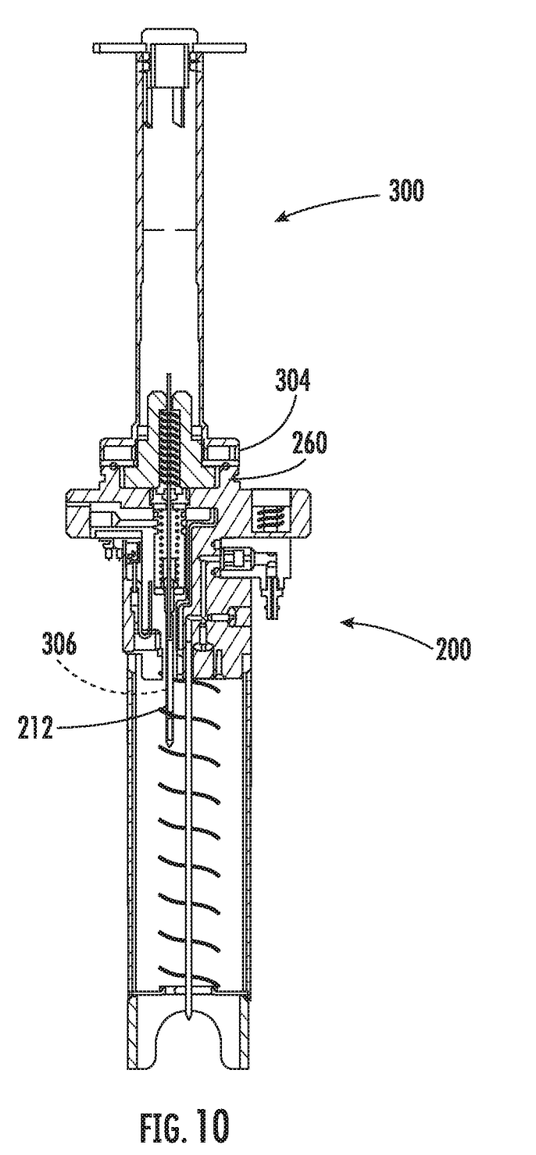
FIG. 10 is a sectional view of the needle trap of FIG. 8 installed on the vial holder of FIG. 3 to form a vial holder-needle trap assembly.

The process for obtaining a purge and trap sample using the system 10 will now be described. The needle trap 300 is first installed into the vial holder 200. This is illustrated in FIG. 10. In this installed position, the needle 306 of the needle trap 300 may be received in the needle trap protection needle 212 of the vial holder 200. The stop 304 of the needle trap 300 may abut an annular raised member 260 on an upper portion of the body 204 of the vial holder 200 (FIG. 4). The assembly shown in FIG. 10 may be referred to herein as a vial holder-needle trap assembly.

The vial 202 is then inserted into the vial holder 200. The vial 202 is shown in a fully inserted position in FIG. 11. The vial 202 may be inserted into the chamber 206 of the vial holder 200 as described above. In the fully inserted position, the purge gas needle 210 and the needle trap protection needle 212 may pierce or puncture the septum 226 of the vial 202. As described above, the needle trap protection needle 212 is optional. When omitted, the needle 306 of the needle trap 300 may be inserted directly in the vial 202. The assembly shown in FIG. 11 may be referred to herein as a vial holder-needle trap-vial assembly.

The present inventors have determined that it is important to install the needle trap 300 into the vial holder 200 before installing the vial 202 into the vial holder 200. If the vial is under pressure, which could be caused by changes in the temperature of the sample, installing the vial without the needle trap in place could result in loss of analytes. That is, there may already be analytes in the head space above the sample that may be lost upon subsequent heating. The analytes would be lost by venting from the vial through the empty needle trap protection needle. With the needle trap in place, if there is pressure build up it will vent through the needle trap and any analytes will be captured on the needle trap.

Figure 12:
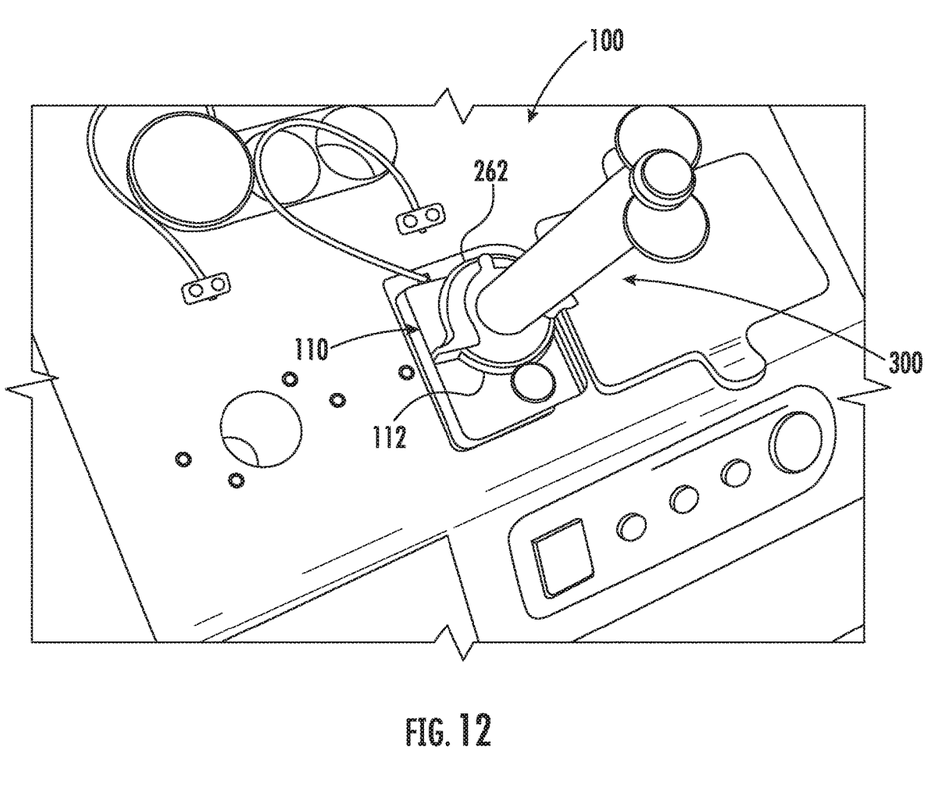
FIG. 12 is a fragmentary perspective view of the vial holder-needle trap-vial assembly of FIG. 11 inserted in a cavity defined by the vial heater assembly of FIG. 6.

Referring to FIG. 12, the vial holder 200 is next inserted into vial heater assembly 110 (e.g., into the receiving cavity 112) of the sample preparation station 100. A clip 262 may be received around the stop 304 of the needle trap 300 and the annular raised member 260 of the vial holder 200 (FIG. 10). The clip 262 may be installed before the vial holder 200 is inserted into the vial heater assembly 110. As described above, the needle trap heater 240 may be connected to the vial heater assembly 110 by slidably inserting the vial holder 200 into the cavity 112.

A purge temperature preheat step is next carried out. This step may allow for the sample S (FIG. 11) to reach equilibrium. The purge temperature preheat parameters and initiation may be set and carried out using the HMI 120 of the sample preparation station 100. The vial heater 114 and/or the needle trap heater 240 may be used during the purge temperature preheat step. The temperature of the vial heater 118 may be measured using the temperature sensor 115 and the temperature of the needle trap heater 240 may be measured using the temperature sensor 242.

Figure 11:
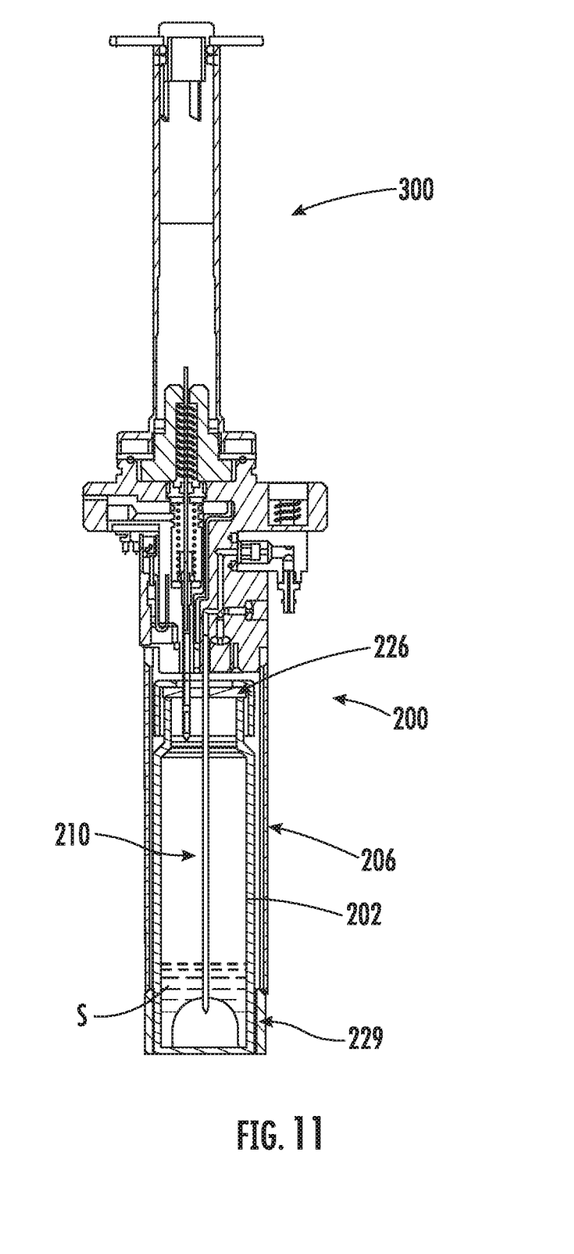
FIG. 11 is a sectional view of a vial inserted into the vial holder of the vial holder-needle trap assembly of FIG. 10 to form a vial holder-needle trap-vial assembly.

A purge step is next carried out at the temperatures from the preheat step. The sample S (FIG. 11) may be at a lower portion 229 of the vial 202. The sample S may be either a liquid (e.g., water) or a solid. As shown in FIG. 11, if the sample S is a liquid, the purge gas needle 210 may extend into the sample S and gas may be purged through the liquid. Alternatively, for some liquid sample S or if the sample S is a solid, the purge gas needle 210 may be positioned above the sample S and gas may be purged over the head space of the sample.

With reference to FIGS. 1 and 4, after the sample has reached the preheat temperature, an inert gas (e.g., helium or nitrogen) is supplied from the gas supply 116 to the inlet port 230 of the vial holder 200 and through the purge gas needle 210. The inert gas is thereby purged through the liquid or over the head space of the liquid or solid. Resultant vapors are passed through the needle trap 300. Analytes are trapped on the packing bed 312 and/or the packing bed 314 in the needle trap 300. Complicated plumbing is not needed because the purge gas needle 210 and/or the needle trap protection needle 212 are inserted into the top of the vial 202.

The present technology employs the needle trap heater 240 to control the temperature of the needle 306 of the needle trap 300 to thereby prevent water from condensing on the needle 306 of the needle trap 300. This temperature can be offset either by a positive or a negative value from the vial temperature. The temperature of the needle trap heater 240 can also be set to match the temperature of the vial heater 118. The needle trap heater offset may be set using the HMI 120 of the sample preparation station 100.

Water condensation on the packing of the needle trap will result in poor and irreproducible recoveries of analytes. It may only take 1° C. or 2° C. of additional heating to prevent water from condensing on the packing. Where used, the needle trap protection needle may be metal and may extend into the vial as does the packing material. The needle trap protection needle may therefore provide some heat conduction to the packed part of the needle trap in addition to protecting the needle trap from plugging.

The present inventors have determined, using the embodiments described herein, that an offset of 7° C. is adequate to prevent condensation on the packing of the needle trap needle. The actual temperature of the packing is less than the offset value because the needle trap needle extends into the top of the vial. The area where the packing is located is 1 mm from the tip of the needle. This is why the needle trap heater temperature needs to be offset by more than just 1° C. or 2° C. to prevent condensation.

The system 10 may be used for preparing samples including analytes such as volatile organic compounds from water samples.

Referring again to FIG. 1, the system 10 may include a portable gas chromatograph/mass spectrometer (GC/MS) instrument 400. The sample collected in the needle trap 300 may be desorbed in the instrument 400 for analysis.

Use of purge and trap (P&T) and heated head space (HHS) equipment is common in the laboratory. Such devices are less common for field sampling. This is because of the high energy costs of heating water samples and the difficulty in dealing with water condensing on the sorbent traps. The high energy costs are a problem in a field portable instrument due to the desire to use battery power to improve portability. The high power consumption is not only due to heating samples but also due to the hardware needed to collect the sample and then desorb it into an analytical instrument. An added problem is the negative effect of moisture on the collection efficiency of traps used for post-purge sample collection. If water condenses on the trap material during the purge process, the collection efficiency of the trap can be reduced. Even in cases where smaller amounts of water are trapped that do not negatively affect trapping efficiency, the trapped water can still have a detrimental effect on the performance of the analytical instrument. For example, water entering a gas chromatographic column can cause poor retention time repeatability. The present technology addresses this problem by providing the needle trap heater that may have an offset temperature setting.

In laboratory equipment, conditions are controlled to avoid the collection of water. This control happens in the form of dry purges to move the water while still retaining the analytes. Once the water has been removed then the analytes are desorbed from the trap into an analytical system such as a gas chromatography (GC) instrument. In the field, it is necessary to carry gas supplies and batteries making it desirable to efficiently use gas and electrical energy. Dry purge steps require the use of extra gas and require complicated plumbing to route the gas past the sample vial so that it will not move more water to the collection trap. The complicated plumbing must be temperature controlled so that water and analytes will not get caught in the lines or valves used for the gas routing. This uses more electrical energy than is desirable for a field portable instrument. With the present technology, complicated plumbing is not needed because the purge gas needle and/or the needle trap protection needle are inserted into the top of the vial.

The foregoing is illustrative of the present technology and is not to be construed as limiting thereof. Although a few exemplary embodiments of this technology have been described, those skilled in the art will readily appreciate that many modifications are possible in the exemplary embodiments without materially departing from the teachings and advantages of this technology. Accordingly, all such modifications are intended to be included within the scope of this invention as defined in the claims. The technology is defined by the following claims, with equivalents of the claims to be included therein.

What is claimed is:

1. A system for preparing a test sample, the system comprising:
   a vial holder comprising:
     a body;
     a vial chamber extending downwardly from the body and configured to hold a vial;
     a purge gas needle extending downwardly from the body;
     a needle trap heater in the body;
     a needle trap connected to the vial holder, the needle trap comprising:
       a needle with the needle trap heater surrounding a distal end portion of the needle; and
       at least one packing bed disposed in the needle at the distal end portion;
   and,
   a sample preparation station comprising:
     a housing; and
     a vial heater assembly in and/or on the housing, the vial heater assembly comprising a vial heater and defining a cavity,
   wherein the vial holder is configured to receive the vial through an end opening at a bottom of the vial chamber, and
   wherein the vial holder is configured to be received in the cavity in an installed position with the vial heater surrounding at least a portion of the vial.

2. The system of claim 1 wherein:
   the vial holder comprises a needle trap protection needle extending downwardly from the body;
   the distal end portion of the needle trap needle is received in the needle trap protection needle; and
   the needle trap heater surrounds at least a portion of the needle trap protection needle.

3. The system of claim 2 wherein:
   the vial chamber defines a longitudinal axis;
   the purge gas needle defines a purge needle axis that is substantially coaxial with the longitudinal axis; and
   the needle trap protection needle defines a needle trap protection needle axis that is offset from and substantially parallel to the longitudinal axis.

4. The system of claim 1 wherein the needle trap heater is configured to heat at an offset temperature that is higher than a temperature that the vial heater heats the vial.

5. The system of claim 4 wherein the offset temperature is at least 1° C. to avoid water condensation on the at least one packing bed.

6. The system of claim 4 wherein:
   the sample preparation station comprises a controller; and
   the controller is configured to independently operate the needle trap heater and the vial heater to heat at different temperatures.

7. The system of claim 1 wherein:
   the vial heater assembly comprises a needle trap heater connection;
   the vial holder comprises a vial heater connection; and
   the needle trap heater connection and the vial heater connection engage one another when the vial holder is received in the cavity in the installed position.

8. The system of claim 7 wherein:
   the sample preparation station comprises a power source; and
   the power source is configured to power both the needle trap heater and the vial heater.

9. The system of claim 1 wherein:
   the system comprises the vial and a sample held in the vial;
   the sample preparation station comprises a pressurized gas supply containing an inert gas;
   the gas supply is in fluid communication with the gas purge needle when the vial holder is received in the cavity in the installed position; and
   the gas supply and the purge needle are configured to purge the sample in the vial with the inert gas such that analytes are trapped on the at least one packing bed of the needle trap.

10. The system of claim 1 wherein the system is portable.

11. A method of preparing a test sample, the method comprising:
    providing:
      a vial comprising a septum at an upper portion thereof;
      a vial holder comprising:
        a body;
        a vial chamber extending downwardly from the body;

a purge gas needle extending downwardly from the body; and,
a needle trap heater in the body;
a needle trap comprising:
a needle having a distal end portion; and,
at least one packing bed disposed in the needle at the distal end portion;
and,
a sample preparation station comprising:
a housing; and,
a vial heater assembly in the housing, the vial heater assembly comprising a vial heater and defining a cavity;
connecting the needle trap and the vial holder such that the needle trap heater surrounds at least a portion of the at least one packing bed; then
inserting the vial through an end opening at a bottom of the vial chamber and into the vial chamber of the vial holder such that the purge gas needle pierces the septum of the vial; and then,
inserting the vial holder into the cavity of the vial heater assembly such that the vial heater surrounds at least a portion of the vial.

12. The method of claim 11 wherein:
the vial holder comprises a needle trap protection needle extending downwardly from the body; and
connecting the needle trap and the vial holder comprises receiving the needle of the needle trap in the needle trap protection needle of the vial holder.

13. The method of claim 11 further comprising:
heating a sample in the vial using the vial heater having a first temperature setting;
heating the at least one packing bed using the needle trap heater having a second temperature setting; and
purging the sample by injecting an inert gas through the purge gas needle.

14. The method of claim 13 wherein the second temperature setting is higher than the first temperature setting.

15. The method of claim 11 wherein:
the vial heater assembly comprises a needle trap heater connection;
the vial holder comprises a vial heater connection on the body; and
inserting the vial holder into the cavity of the vial heater assembly comprises connecting the needle trap heater connection and the vial heater connection such that the sample preparation station provides power to the needle trap heater.

16. The method of claim 11 wherein:
the vial chamber comprises a terminal end defining the end opening; and
inserting the vial into the vial chamber of the vial holder comprises receiving the upper portion of the vial through the end opening and urging the vial toward the body of the vial holder.

17. The method of claim 16 wherein:
the vial holder comprises a plate and a spring disposed in the vial chamber;
the purge gas needle extends through a center of the plate; and,
the plate translates toward the body of the vial holder and the spring compresses as the vial is urged toward the body of the vial holder.

\* \* \* \* \*